United States Patent [19]

Och

[11] Patent Number: 4,517,743
[45] Date of Patent: May 21, 1985

[54] GAUGE

[75] Inventor: Rudolf Och, Nuremberg, Fed. Rep. of Germany

[73] Assignee: Frenco Verzahnungslehren GmbH, Nuremberg, Fed. Rep. of Germany

[21] Appl. No.: 452,018

[22] Filed: Dec. 21, 1982

[51] Int. Cl.³ .............................. G01B 5/08; G01B 5/12
[52] U.S. Cl. .............................. 33/147 M; 33/179.5 R; 33/DIG. 14
[58] Field of Search ......... 33/147 M, 147 K, 179.5 R, 33/179.5 A, 179.5 B, DIG. 14

[56] References Cited

U.S. PATENT DOCUMENTS

| 1,725,342 | 8/1929 | Copland | 33/DIG. 14 |
| 2,561,534 | 7/1951 | Parker et al. | 33/147 M |
| 2,716,554 | 8/1955 | Lowe | 33/179.5 R |
| 2,761,560 | 9/1956 | Pomernacki | 33/179.5 R |
| 2,849,802 | 9/1958 | Stapleton | 33/179.5 B |
| 3,507,049 | 4/1970 | Heldt et al. | 33/179.5 R |
| 3,771,229 | 11/1973 | Reef | 33/147 M |

FOREIGN PATENT DOCUMENTS

| 347409 | 1/1922 | Fed. Rep. of Germany .. 33/179.5 A |
| 6740 | 3/1969 | Japan | 33/179.5 B |

Primary Examiner—Richard R. Stearns
Attorney, Agent, or Firm—Peter K. Kontler

[57] ABSTRACT

A gauge for checking the quality (accuracy; tolerance: trueness) of gear teeth is provided with a set of gauging teeth which, when the gauge is used, mesh with the teeth to be checked. This effects automatic alignment of the actual contact pins relative to the teeth to be checked.

16 Claims, 5 Drawing Figures

GAUGE

BACKGROUND OF THE INVENTION

The present invention relates to a gauge, i.e. a testing device.

More particularly, the invention relates to a gauge for inspecting and indicating the quality of gear teeth on a workpiece.

Gears are known in many varieties and for multitudinous applications; for example, in mechanical machines gears are used for furnishing or transmitting motive power. Gears may have internal and/or external teeth and be constructed as spur gears, helical gears or involute gears. It is also known to use diverse kinds of gauges to check the quality of the gear teeth on such gears, i.e. whether the teeth are properly oriented, whether they are within the permissible tolerances, and the like.

One prior-art gauge, intended particularly for the testing of internal teeth on a gear, has two contact pins which are arranged symmetrically with reference to a longitudinal axis of the gauge and are movable radially. The free ends of these pins each are ball-shaped or carry a ball-shaped portion.

These pins are inserted into the confines of the internal gear to be checked; during this insertion the pins are in a radially retracted position. However, they are being biased in radially outward direction by a spring so that, when they are in place for performing the check, their ball-shaped ends are pressed by this spring in the radially outward direction until they enter between the flanks of the teeth to be inspected. A lengthwise movable rod is connected to the pins and moves through a distance which depends upon the extent of the radially outward movement of the pins. This lengthwise movement of the rod is a measure of the tooth quality and is transmitted to an external indicator, such as a dial.

A problem with this prior-art device is that the pins must be very precisely inserted into the teeth being checked, so that their contact faces (i.e. the ball-shaped portions) are located exactly in a plane that is common to them as they contact the teeth of the gear. This is an extremely difficult undertaking, unless one uses an alignment rod or similar fixture in order to position the two pins in a common plane and keep them there. Consequently, the use of such a fixture is necessary; however, the use of the fixture, especially of an alignment rod, in turn requires the presence of a planar abutment surface against which the fixture can rest at the end opening where the gauge is being inserted. Quite often, such an abutment face does not exist or is not planar or not sufficiently planar. This requires either that the workpiece must be deliberately provided with such an abutment face (meaning an additional operating step and consequent increase in manufacturing costs), or else the absence of the abutment face makes taking an accurate measurement that much more difficult.

OBJECTS AND SUMMARY OF THE INVENTION

An object of the invention is to provide an improved gauge for inspecting and indicating the quality of gear teeth on a workpiece.

Another object of the invention is to provide such an improved gauge in which the insertion of the contact-making test components into the teeth of a workpiece being checked, is simple and uncomplicated.

Still a further object of the invention is to provide a gauge of the type under discussion, which is capable of making measurements that are free of setting and/or guidance errors.

In keeping with these objects, and with still others that will become apparent hereafter as the description proceeds, one aspect of the invention resides in the provision of a gauge which includes a hollow elongated member (which might also be called a hollow shaft) having an axis and a leading end portion provided with inner and outer circumferential surfaces, and a set of gauging teeth on at least one of these surfaces. These gauging teeth are dimensioned and shaped so as to mate very precisely with the teeth to be inspected on a workpiece.

The gauge may further have a test element which is located within the confines of the one surface and which has at least one component movable into and out of testing engagement with a tooth on the workpiece. The one surface is provided with at least one slot that extends both lengthwise of the axis and radially thereof, and an arrangement is provided which mounts the test element so that the aforementioned component thereof is located in the slot with freedom of movement in at least one of the previously mentioned extensions of the slot, i.e. in direction axially and/or radially of the axis.

A gauge embodying the features of the present invention avoids the disadvantages of the prior art. Furthermore, the gauging teeth provided on it assure positive and exact guidance of the gauge during its mating engagement with the teeth of the workpiece, as well as further assuring similarly positive and exact guidance of the one or more testing components of the test element.

Moreover, the novel gauge permits the checking operation to be carried out in a single working step, thereby saving time and expenses.

Another factor in saving time and expenses is the fact that there is no need for the novel gauge to be adjusted or aligned (as in the prior art). This speeds up the testing operation considerably and, since it does not require any cooperation with the workpiece other than with the teeth of the same, permits testing of workpieces which are as yet unfinished but for their teeth.

It is also highly advantageous that the test operation is fully reproducable, in the sense that the gauging teeth always assure that the testing component(s) will be uniformly located with reference to any desired number of workpieces to be successively checked. This means that even very tight tolerance variations can be checked on a series of successively tested workpieces.

The novel features which are considered to be characteristic of the invention are set forth in particular in the hereto appended claims. The improved device itself, however, together with details of its construction and the best mode of operation currently known to applicant, as well as additional features and advantages of the invention, will be best understood upon a perusal of the following detailed description of specific although purely exemplary embodiments with reference to the accompanying drawing.

DESCRIPTION OF PREFERRED EMBODIMENTS

Figure 1:
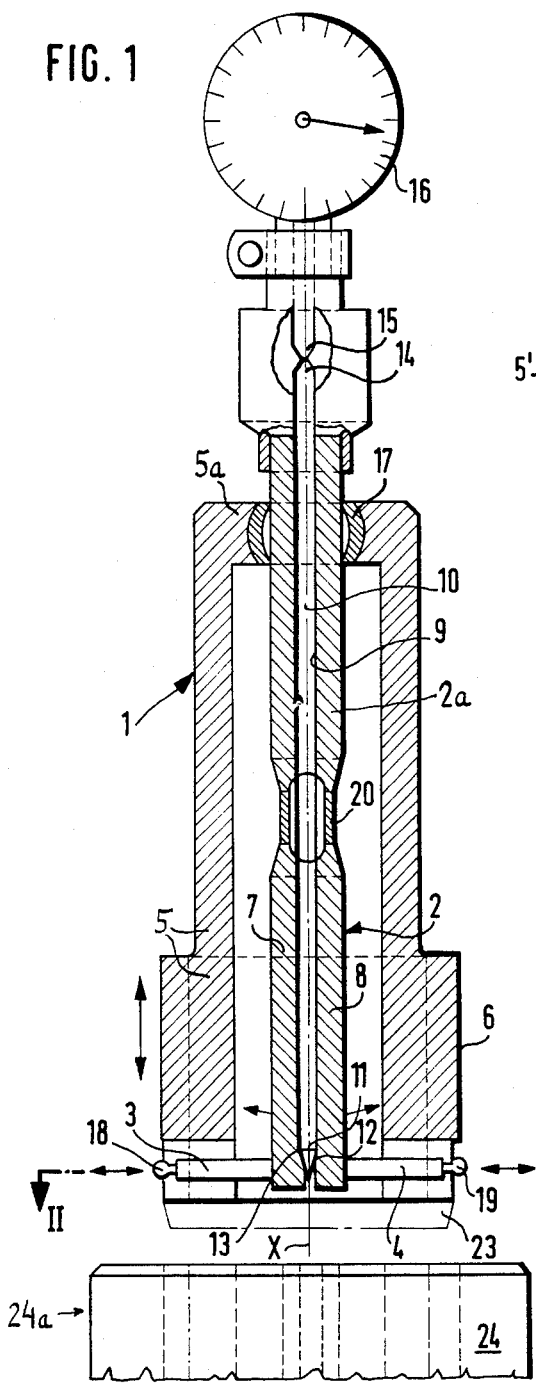
FIG. 1 is a longitudinal section through a gauge in accordance with one embodiment of the invention.
Figure 2:
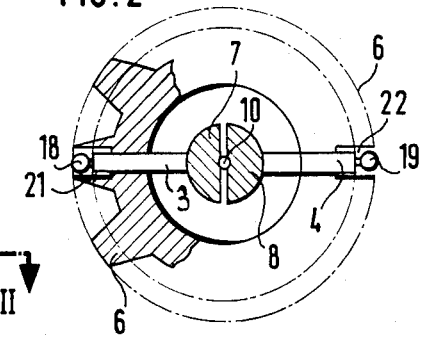
FIG. 2 is a section on line II—II of FIG. 1.

A first embodiment of the invention is illustrated in FIGS. 1 and 2, which will now be described. However, it should be understood with reference to the remaining Figures that like reference numerals have been used throughout the drawing to designate like elements.

The gauge according to all Figures has a head or test element 2 which is provided at or adjacent its free ends with at least one testing component 3 (or with two testing components 3 and 4). A hollow, elongated member or shaft 5 surrounds the test element 2 and is provided with a set of gauging teeth 6 (6a in FIG. 3 and 6b in FIGS. 4 and 5).

In the embodiment of FIGS. 1 and 2 the gauge 1 is intended for checking the quality of internal gear teeth 24 provided on a workpiece 24a. Its test element 2 has two radially spreadable arms 7, 8 and an upper portion 2a to which the arms 7, 8 are connected by flexible means 20. Such flexible means may be in form of one or more separate spring members, or it may simply be in form of a suitably weakened portion or portions of the arms 7, 8 and/or the portion 2a. In any case, the purpose of the means 20 is, of course, to permit the aforementioned radial spreading of the arms 7, 8. The free end portions of the arms, i.e. those distal from the spring means, each carry a testing component 3 and 4, respectively, which move radially outwardly with reference to the longitudinal center axis X of the member 5 when spreading of the arms occurs.

The head 2 has a central longitudinal bore 9 in which a drive shaft or pin 10 is axially slidable. The end of pin 10 which is proximal to the components 3, 4 is provided with a pair of wedge faces 11; these engage and cooperate with respective abutment faces 12 and 13 on the arms 7 and 8 so that, as the arms move apart, the pin 10 will slide downwardly (in the Figure) and will slide upwardly (again, the reference is to the Figure) when the arms move towards each other. The opposite end 14 of pin 10 is provided with a contact face which engages the pressure pin 15 of a dial-gauge indicator 16. Thus, axial sliding movement of the pin 10 results in different indications on the dial of indicator 16.

Head 2 is mounted for swivel movement in a bearing 17 which is installed in an opening of the transverse endwall 5a of element 5. This bearing 17 is advantageously a swivel bearing, but can also be of a different type; for example, it could be a ring of rubber or another elastomeric material. Being mounted in this manner via the element 2, the components 3, 4 can be readily inserted into the internal gear teeth 24 of the workpiece 24a, irrespective of whether the axis X is aligned with the central longitudinal axis of the annulus of gear teeth 24, since the components 3, 4 are self-aligning with this arrangement.

The insertion of the components 3, 4 into the gear annulus 24 is facilitated, and the accuracy of the quality test is improved, by the presence of the gauging teeth 6. As already indicated, these are provided on the shaft 5, or more specifically on the circumferential wall of the same. In FIGS. 1 and 2 the teeth 6 are provided on the outer circumferential surface of the shaft 5 in the region of the front end portion of the same. They may, but need not form an annulus thereon, but they must be very precisely shaped so as to mirror-symmetrically correspond (and exactly mate) with the teeth 24 to be checked.

When the novel gauge is inserted into the internal gear 24a, the teeth 6 matingly enter between the flanks of the teeth 24. At the same time the components 3, 4—which may be provided on their free ends with e.g. ball-shaped contact faces 18 and 19—also enter between the flanks of the gear teeth 24. When thereafter relative axial movement is caused to take place between the gauge 1 and the gear 24a, the contact faces of the freely radially shiftable components 3, 4 scan or feel the profile of the flanks of gear teeth 24. The resulting radial movement of the components 3, 4 is translated into axial movement of the pin 10 via the cooperating faces 11, 12 and 13. In turn, the movement of the pin 10 is transmitted to the pressure pin 15 whose resulting axial displacement is indicated by a corresponding movement of the pointer on the dial of indicating gauge 16.

The flexible (e.g. spring) means 20 permits symmetrical spreading of the arms 7, 8 relative to the axis X. It may be located as illustrated in FIG. 1, but also be placed elsewhere (e.g. closer to the bearing 17), as long as the radial spreading function of the arms 7, 8 is unimpaired.

Two of the teeth 6 are provided with slots or recesses 21, 22 of generally bifurcate or fork-like cross-section. These slots extends radially through the teeth 6 and the circumferential wall of the shaft 5; in addition, they are elongated lengthwise of the axis X, as FIG. 1 shows. The components 3,4 are permanently biased in radially outward direction by the arms 7, 8. Since they are each located in one of the recesses 21, 22 they thus have freedom of radial movement as well as of axial movement (the latter at least to the extent of the maximum stroke of which the shaft 10 is capable).

The entry of the front end portion of shaft 5, and with it of the gauging teeth 6, into the annulus of gear teeth 24 can be made easier by providing the front end of shaft 5 and of the gauging teeth 6, with a bevelled collar or centering ring 23.

Of course, the gauge according to the invention is not restricted to use with only internal-tooth workpieces. Slight modifications will make it suitable for use with external-tooth workpieces without in any way departing from the gist of the invention.

Figure 3:
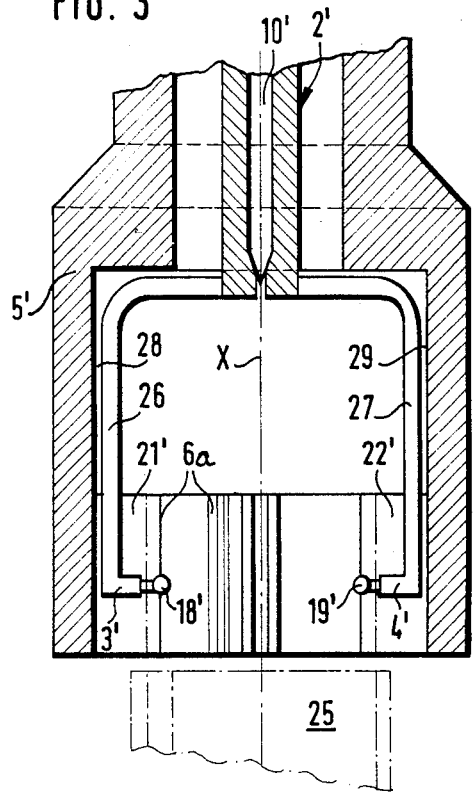
FIG. 3 is a fragmentary section analogous to FIG. 1, but illustrating a further embodiment of the invention.

One embodiment suitable for use in checking external tooth workpieces is illustrated in FIG. 3. The head 2' is here shown to be (but need not be) configurated in fork-like manner, analogous to the shape of a tuning fork. It has two projecting prongs 26, 27 which carry at or near their free ends the (here radially inwardly facing) components 3', 4' with their respective contact faces 18', 19'. Again, head 2' is concentrically surrounded by the shaft 5', the front end portion of which is also again provided with the gauging teeth. These, however, are here designated with reference numeral 6a and are provided on the inner, rather than the outer circumferential surface of shaft 5'. As in the preceding embodiment, two oppositely located teeth 6a are again provided with the slot-shaped recesses 21', 22' into which the prongs 26, 27 and the components 3', 4' can recede and from which they can move out in radially inward direction for engagement with the flanks of teeth on the internally toothed workpiece 25. To permit complete retraction, the wall of shaft 5′ is formed with recesses 28, 29 which communicate with the recesses 21′, 22′ and have the same, or at least generally the same dimensions as those recesses. The motion-transmission between components 3′, 4′ and pin 10′, and the indication via the instrument 16, are the same as in FIGS. 1 and 2.

The basic principle of checking external teeth on a workpiece applies not only to gears, but can also be used in connection with elongated racks. For this purpose the head 2 could be constructed as a ring which surrounds the shaft 5 and from which the components are pressed outwardly against the teeth of a rack to be tested. The testing principle is thus analogously the same as previously discussed.

Figure 5:
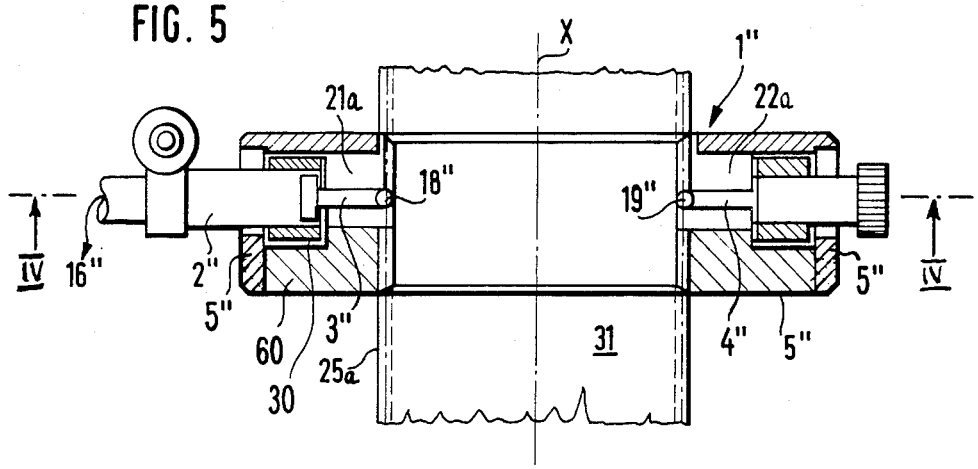
FIG. 5 is a section taken on line V—V of FIG. 4.
Figure 4:
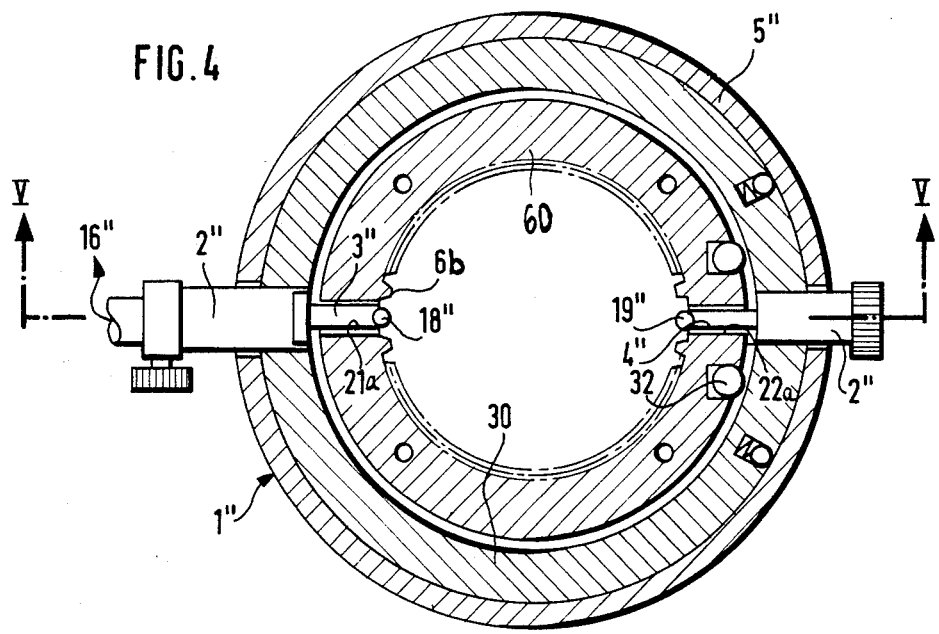
FIG. 4 is a section taken on line IV—IV of FIG. 5 and illustrates still another embodiment of the invention.

Finally, the embodiment of FIGS. 4 and 5 corresponds generally to that in FIG. 3. It differs from the same mainly in that the gauge 1 in FIGS. 4 and 5 can be pushed over the entire axial length of the teeth 25a which form part of a workpiece 31 and are to be checked for their quality. Again, like reference numerals identify the same elements as in preceding embodiments but each numeral is followed by two primes. Here, however, the gauge teeth 6b are provided on the inner circumferential surface of a ring member 60 which is surrounded by another ring member 30; the latter is in turn surrounded by the shaft 5″. Ring member 30 is coupled to the shaft 5″, and ring member 60 is coupled via arresting means (here illustrated as detent balls 32) to ring member 30, to prevent relative movement of these members and also to maintain them in proper relative alignment. The members 30 and 60, although discrete elements, may be considered part of the shaft 5″.

Members 60 and 30 have respective registering and communicating slot-like recesses 21a and 22a, respectively, in which the components 3″, 4″ are radially and axially displaceable (compare FIGS. 4 and 5). With this embodiment of the inventive gauge the checking of external gear teeth, such as are for example found on gear racks and certain types of shafts, is particularly simple because it is merely necessary to pass the workpiece through the gauge by effecting relative movement. This is diagrammatically shown in FIG. 5 by the broken lines.

It will be understood that various modifications are possible in the illustrated embodiments without departing from the concept of the invention. For example, a single component 3 or 4 could be used, and either or both of these mechanical components 3, 4 could be replaced with optical devices (e.g. photoelectric cells), acoustical devices (e.g. ultrasonic emitters/receivers) or the like. The only consideration there is whether the respective device to be used is small enough to be accommodated within the available space.

Without further analysis, the foregoing will so fully reveal the gist of the present invention that others can, by applying current knowledge, readily adapt it for their various applications without omitting features that, from the standpoint of prior art, fairly constitute essential characteristics of the generic and specific aspects of the inventive contribution to the art. Therefore, such adaptations should—and indeed are intended to—be comprehended within the meaning and scope of equivalance of the appended claims.

I claim:

1. A gauge, particularly for inspecting and indicating the quality of gear teeth on a workpiece, comprising a hollow elongated member having an axis and a leading end portion provided with inner and outer circumferential surfaces;
a set of gauging teeth on at least one of said surfaces and shaped and dimensioned to mate precisely with the teeth to be inspected on a workpiece;
a test element located within the confines of said one surface and having at least one component movable into and out of testing engagement with a tooth on the workpiece;
said one surface having at least one slot extending in lengthwise as well as in radial direction of said axis; and
means mounting said test element so that said component is located in said slot with freedom of movement in at least one of said directions.

2. A gauge as defined in claim 1, each of said gauging teeth having a central longitudinal axis, and said slot being symmetrical with reference to the central longitudinal axis of one of said teeth.

3. A gauge as defined in claim 1, said test element further comprising another component and said one surface having another slot, each similar to and located oppositely with reference to the first-mentioned component and slot, respectively.

4. A gauge as defined in claim 3, wherein said test element has a central longitudinal axis and a pair of arms symmetrical relative to said longitudinal axis and each carrying one of said components; and flexible means mounting said arms for radial displacement relative to said longitudinal axis towards and away from each other.

5. A gauge as defined in claim 4, wherein said components are contact pins.

6. A gauge as defined in claim 3, said test element having a rear portion and a bifurcated front portion provided with two prongs each having one end connected to said rear portion and another end carrying one of said components.

7. A gauge as defined in claim 1, and further comprising indicating means operatively connected with said test element for indicating the test results thereof.

8. A gauge as defined in claim 1, wherein said member surrounds said test element.

9. A gauge as defined in claim 1, said slot being provided in one of said gauging teeth and being at least in part of fork-like cross-section.

10. A gauge as defined in claim 1, said elongated member having an axially extending passage in which said test element is positioned; and said mounting means comprising a bearing in said passage.

11. A gauge as defined in claim 10, wherein said bearing is a pivot bearing.

12. A gauge as defined in claim 1, wherein said gauge teeth are provided on said outer surface.

13. A gauge as defined in claim 1, said test element having a bifurcated front portion provided with two prongs, said component being on one of said prongs, and said gauging teeth forming an annulus surrounding said prongs.

14. A gauge, particularly for inspecting and indicating the quality of gear teeth on a workpiece, comprising a hollow member having an axis and including a circumferential wall having an outer surface, a discrete ring part surrounded by said wall, and an annular member surrounded by said ring part and having an inner surface; a set of gauging teeth provided on said inner surface and shaped and dimensioned to mate precisely with the teeth to be inspected on a workpiece; a test element located within the confines of said inner surface and having two components movable into and out of testing engagement with a tooth on the workpiece, said inner surface having two slots extending in lengthwise as well as in radial direction of said axis and being located opposite each other with reference to said axis; and means mounting said test element so that each of said components is located in a different one of said slots with freedom of movement in at least one of said directions.

15. A gauge as defined in claim 14, said ring part having cut-outs which register with and in shape at least generally conform to said slots.

16. A gauge as defined in claim 14; and further comprising arresting means for arresting said ring part and annular member against movement relative to one another.

* * * * *